United States Patent
Fang et al.

(10) Patent No.: US 11,039,106 B2
(45) Date of Patent: *Jun. 15, 2021

(54) DISTRIBUTION ELEMENT FOR A SELF-CALIBRATING RF NETWORK AND SYSTEM AND METHOD FOR USE OF THE SAME

(71) Applicant: Enseo, Inc., Richardson, TX (US)

(72) Inventors: William C. Fang, Plano, TX (US); Raymond S. Horton, McKinney, TX (US); Vanessa Ogle, Fairview, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,702

(22) Filed: Sep. 20, 2019

(65) Prior Publication Data

US 2020/0014883 A1 Jan. 9, 2020

Related U.S. Application Data

(63) Continuation of application No. 15/723,769, filed on Oct. 3, 2017, now Pat. No. 10,425,617.

(Continued)

(51) Int. Cl.
*H04N 7/16* (2011.01)
*H04N 7/173* (2011.01)
(Continued)

(52) U.S. Cl.
CPC ............ *H04N 7/173* (2013.01); *H04N 7/102* (2013.01); *H04N 7/106* (2013.01); *H04N 21/438* (2013.01);
(Continued)

(58) Field of Classification Search
CPC .... H04N 7/17318; H04N 7/173; H04N 7/181; H04N 7/17309; H04N 7/17354;
(Continued)

(56) References Cited

U.S. PATENT DOCUMENTS 3,781,703 A 12/1973 Duty
4,003,006 A 1/1977 Mandeville et al.
(Continued)

OTHER PUBLICATIONS

Ching-Hung Chang; Hybrid cable TV and orthogonal-frequency.. transport system basing on single wavelength polarization and amplitude remodulation schemes; Optics Letters; vol. 36, pp. 1716-1718; 2011 (Year: 2011).*

*Primary Examiner* — Annan Q Shang
(74) *Attorney, Agent, or Firm* — Scott Griggs; Griggs Bergen LLP (57) ABSTRACT

A distribution element for a self-calibrating RF network and system and method for use of the same are disclosed. In one embodiment of the distribution element, the distribution element is located between a headend layer and an endpoint layer. An upstream directional control circuit and a downstream directional control circuit are positioned in a spaced opposing relationship such that respective upstream line and the downstream line are separated into a forward line and reverse line therebetween while being combined at the respective upstream directional control circuit and the downstream directional control circuit. A pair of amplifier circuits positioned between the upstream and downstream control circuits are under the control of a controller to amplify and shape the signal of the forward line and the reverse line. The controller monitor and analyzes signals through the distribution element.

20 Claims, 3 Drawing Sheets

Related U.S. Application Data (60) Provisional application No. 62/562,009, filed on Sep. 22, 2017, provisional application No. 62/403,244, filed on Oct. 3, 2016.

(51) Int. Cl.

| | | |
|---|---|---|
| *H04N 7/10* | (2006.01) | |
| *H04N 21/438* | (2011.01) | |
| *H04N 21/61* | (2011.01) | |
| *H04N 21/647* | (2011.01) | |
| *H04N 21/442* | (2011.01) | |

(52) U.S. Cl.
CPC ... *H04N 21/44209* (2013.01); *H04N 21/6168* (2013.01); *H04N 21/64738* (2013.01)

(58) Field of Classification Search
CPC ...... H04N 7/106; H04N 7/102; H04N 21/438; H04N 21/6168; H04N 21/64738; H04N 21/44209; H04N 21/47202; H04N 21/4722; H04N 21/6125
See application file for complete search history.

(56) References Cited

U.S. PATENT DOCUMENTS

| | | | |
|---|---|---|---|
| 5,109,286 A | 4/1992 | West, Jr. et al. | |
| 5,390,348 A | 2/1995 | Magin et al. | |
| 5,864,672 A | 1/1999 | Bodeep | |
| 6,351,631 B1 | 2/2002 | Noeske et al. | |
| 6,363,241 B1 | 3/2002 | Barakat | |
| 6,430,200 B1 | 8/2002 | Han et al. | |
| 6,587,012 B1 | 7/2003 | Farmer et al. | |
| 6,861,975 B1 | 3/2005 | Coleman, Jr. | |
| 7,058,436 B2 | 6/2006 | Kai et al. | |
| 7,693,491 B2 | 4/2010 | Pan | |
| 7,792,183 B2 | 9/2010 | Massey et al. | |
| 8,325,613 B2 | 12/2012 | Okamoto | |
| 8,776,155 B2 | 7/2014 | Prodan | |
| 8,990,864 B2 | 3/2015 | Anandakumar et al. | |
| 10,425,617 B2 | 9/2019 | Fang et al. | |
| 2002/0044610 A1 | 4/2002 | Jones | |
| 2002/0160800 A1 | 10/2002 | Rozmaryn | |
| 2002/0183033 A1 | 12/2002 | Gu et al. | |
| 2003/0022631 A1* | 1/2003 | Rhodes | H04N 7/17309 455/78 |
| 2004/0255332 A1 | 12/2004 | Bertonis | |
| 2005/0157804 A1 | 7/2005 | Jones | |
| 2005/0183130 A1 | 8/2005 | Sadja et al. | |
| 2005/0204397 A1* | 9/2005 | Miyazoe | H04N 17/00 725/107 |
| 2006/0116082 A1 | 6/2006 | Pan | |
| 2006/0146169 A1 | 7/2006 | Segman | |
| 2006/0205342 A1 | 9/2006 | McKay | |
| 2006/0211368 A1 | 9/2006 | Wisnia | |
| 2006/0274677 A1 | 12/2006 | Tomich | |
| 2007/0288981 A1* | 12/2007 | Mitsuse | H04H 20/12 725/124 |
| 2008/0061842 A1 | 3/2008 | Paraschou et al. | |
| 2008/0084956 A1 | 4/2008 | Paraschou et al. | |
| 2008/0114639 A1 | 5/2008 | Meek | |
| 2008/0256421 A1 | 10/2008 | Gerstel et al. | |
| 2008/0261588 A1 | 10/2008 | Struhsaker | |
| 2008/0279123 A1 | 11/2008 | Struhsaker | |
| 2009/0185037 A1 | 7/2009 | Shi et al. | |
| 2009/0232226 A1* | 9/2009 | Knutson | H04N 21/6168 375/240.29 |
| 2009/0265745 A1 | 10/2009 | Egan, Jr. et al. | |
| 2010/0017842 A1 | 1/2010 | Wells | |
| 2010/0095344 A1* | 4/2010 | Newby | H04N 21/6118 725/125 |
| 2010/0100918 A1 | 4/2010 | Egan, Jr. et al. | |
| 2010/0100921 A1 | 4/2010 | Olson et al. | |
| 2010/0100922 A1 | 4/2010 | Olson et al. | |
| 2010/0125877 A1 | 5/2010 | Wells et al. | |
| 2010/0146564 A1 | 6/2010 | Halik et al. | |
| 2010/0189042 A1 | 7/2010 | Pan | |
| 2010/0244980 A1 | 9/2010 | Olson et al. | |
| 2010/0251314 A1 | 9/2010 | Olson et al. | |
| 2010/0251320 A1 | 9/2010 | Shafer et al. | |
| 2010/0251321 A1 | 9/2010 | Palinkas et al. | |
| 2010/0251322 A1 | 9/2010 | Palinkas et al. | |
| 2010/0251323 A1 | 9/2010 | Jackson | |
| 2010/0301972 A1 | 12/2010 | Alkan | |
| 2010/0315942 A1 | 12/2010 | Jackson et al. | |
| 2011/0072472 A1 | 3/2011 | Wells et al. | |
| 2011/0085045 A1 | 4/2011 | Kelma | |
| 2011/0085452 A1 | 4/2011 | Kelma et al. | |
| 2011/0085480 A1 | 4/2011 | Kelma et al. | |
| 2011/0085586 A1 | 4/2011 | Kelma et al. | |
| 2011/0088077 A1 | 4/2011 | Kelma et al. | |
| 2011/0181371 A1 | 7/2011 | Alkan et al. | |
| 2011/0187481 A1 | 8/2011 | Alkan et al. | |
| 2011/0199490 A1 | 8/2011 | Shafer et al. | |
| 2011/0258677 A1* | 10/2011 | Shafer | H04N 21/6168 725/116 |
| 2011/0307548 A1 | 12/2011 | Fisk | |
| 2012/0269515 A1 | 10/2012 | Cvijetic | |
| 2013/0070826 A1 | 3/2013 | Nielsen | |
| 2013/0088987 A1 | 4/2013 | Preschutti | |
| 2013/0125182 A1* | 5/2013 | Bowler | H04L 27/0006 725/105 |
| 2013/0294462 A1* | 11/2013 | Chang | H04L 12/2838 370/497 |
| 2013/0318217 A1 | 11/2013 | Imes | |
| 2013/0332968 A1 | 12/2013 | Anandakumar et al. | |
| 2014/0010269 A1 | 1/2014 | Ling | |
| 2015/0254726 A1 | 9/2015 | Cassidy | |
| 2015/0341927 A1* | 11/2015 | Wei | H04L 1/1854 370/280 |
| 2017/0019242 A1* | 1/2017 | Jin | H04B 3/487 |
| 2017/0182447 A1* | 6/2017 | Sappok | B01D 46/0086 |
| 2017/0331533 A1 | 11/2017 | Strong | |
| 2018/0167669 A1* | 6/2018 | Wells | H04N 21/63 |
| 2018/0262363 A1* | 9/2018 | Chamberlain | H04L 12/2898 |

\* cited by examiner

Fig.1

DISTRIBUTION ELEMENT FOR A SELF-CALIBRATING RF NETWORK AND SYSTEM AND METHOD FOR USE OF THE SAME

PRIORITY STATEMENT & CROSS-REFERENCE TO RELATED APPLICATIONS

This application is a continuation of co-pending U.S. patent application Ser. No. 15/723,769 entitled "Distribution Element for a Self-Calibrating RF Network and System and Method for Use of the Same" filed on Oct. 3, 2017, in the names of William C. Fang et al., now U.S. Pat. No. 10,425,617, issued on Sep. 24, 2019; which claims priority from (1) U.S. Patent Application Ser. No. 62/562,009, entitled "Distribution Element for a Self-Calibrating RF Network and System and Method for Use of Same" filed on Sep. 22, 2017, in the name of William C. Fang; and (2) U.S. Patent Application Ser. No. 62/403,244 entitled "Self-Calibrating RF Network and System and Method for Use of the Same" filed on Oct. 3, 2016, in the names of William C. Fang and Vanessa Ogle; which are hereby incorporated by reference for all purposes. This application discloses subject matter related to the subject matter disclosed in the following commonly owned, co-pending application: U.S. patent application Ser. No. 15/723,608 entitled "Self-Calibrating RF Network and System and Method for Use of the Same" and filed on Oct. 3, 2017, in the names of William C. Fang et al.; all of which are hereby incorporated by reference for all purposes.

TECHNICAL FIELD OF THE INVENTION

This invention relates, in general, to high-bandwidth data transfers over an existing cable TV (CATV) radio frequency (RF) network and, in particular, to a distribution element for self-calibrating RF networks and systems and methods for use of the same that address and enhance network performance.

BACKGROUND OF THE INVENTION

Without limiting the scope of the present invention, the background will be described in relation to televisions in the hospitality lodging industry, as an example. To many individuals, a television is more than just a display screen, rather it is a doorway to the world, both real and imaginary, and a way to experience new possibilities and discoveries. Consumers are demanding enhanced content in an easy-to-use platform. As a result of such consumer preferences, the quality of content and ease-of-use are frequent differentiators in determining the experience of guests staying in hospitality lodging establishments. Accordingly, there is a need for improved systems and methods for providing enhanced content in an easy-to-use platform in the hospitality lodging industry.

SUMMARY OF THE INVENTION

It would be advantageous to achieve a high bandwidth data transfer RF network that would improve upon existing limitations in performance. It would also be desirable to enable a computer-based electronics and software solution that would provide an experience in the hospitality lodging industry, or in another environment, with minimum video glitches and data interruptions. To better address one or more of these concerns, a distribution element for a self-calibrating RF network and system and method for use of the same are disclosed. In one embodiment of the distribution element, the distribution element is located between a headend layer and an endpoint layer. An upstream directional control circuit and a downstream directional control circuit are positioned in a spaced opposing relationship such that a respective upstream line and a downstream line are separated into a forward line and reverse line therebetween, while being combined at the respective upstream directional control circuit and the downstream directional control circuit. A pair of amplifier circuits positioned between the upstream and downstream control circuits are under the control of a controller to amplify and shape the signal of the forward line and the reverse line. The controller monitors and analyzes signals through the distribution element. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
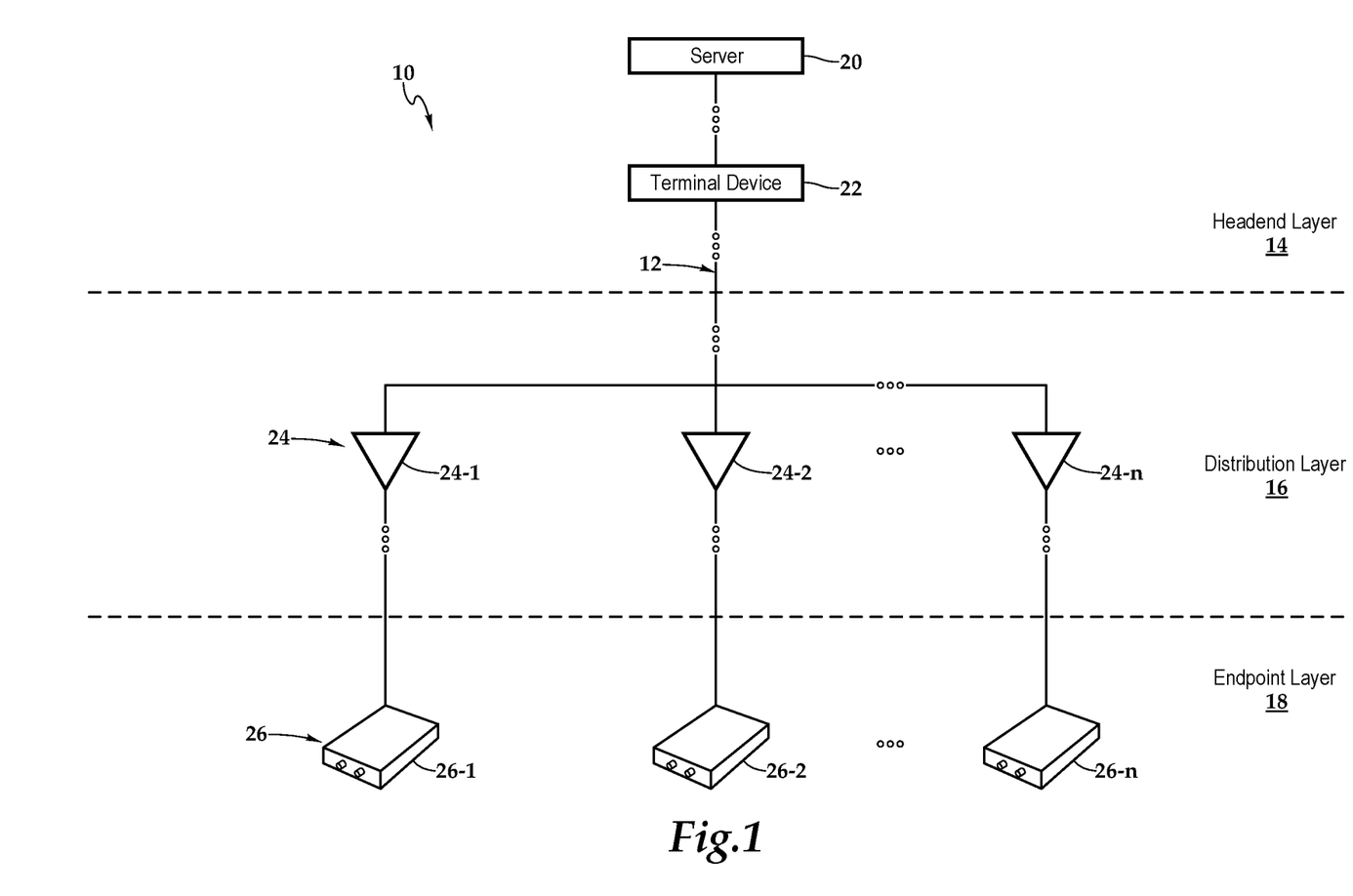
FIG. 1 is a schematic diagram depicting one embodiment of a self-calibrating RF network having high-bandwidth data transfers thereon using a distribution element according to the teachings presented herein.

Referring initially to FIG. 1, therein is depicted one embodiment of a system for providing self-calibrating RF networks, which is schematically illustrated and generally designated 10. As shown, the system 10 spans a network 12 including a headend layer 14, a distribution layer 16, and an endpoint layer 18. The network 12 includes an RF network portion and may include the Internet, for example. The headend layer 14 includes a server 20 and a terminal device 22. The distribution layer includes distribution elements 24, which are individually labeled 24-1 through 24-n, and may be referred to individually as distribution element 24 or collectively as distribution elements 24. The endpoint layer includes endpoint devices 26 which are individually labeled 26-1 through 26-n, and may be referred to individually as endpoint devices 26 or collectively as endpoint devices 26.

As shown, the server 20 may be a management server located in a cloud or an on-premises server, for example. The server utilizes the network 12 to communicate with one or multiple properties, such as a hospitality lodging establishment. The hospitality lodging establishment or, more generally, hospitality property, may be a multi-family residence, dormitory, lodging establishment, hotel, hospital, or other multi-unit environment, for example.

In some embodiments, each of the hospitality properties may include an RF network forming a portion of the network 12 and having a separate property server located in communication with the terminal device 22. Such a property server and the terminal device 22 may be at least partially integrated. The terminal device 22 provides data services through the distribution elements 24 to the end-point devices 26, which subscribe to the data services. More specifically, the terminal device 22 includes point-to-multipoint transmission in a downstream direction and multipoint-to-point transmission in the upstream direction. Further, the terminal device 22 may be a Cable Modem Termination System (CMTS) or a video distribution modulation device, for example. The distribution elements 24 may provide bi-directional RF signal distribution capability between the end point devices 26 and the terminal device 22. Additionally, the distribution elements 24 may provide self-generating upstream and downstream test signals for signal path diagnostic purposes. The end point devices 26 furnish upstream maintenance on power adjustments through ranging requests and the end point devices 26 may include cable modem receivers, set-top boxes, cable-ready televisions, or cable-ready computers, for example. As illustrated, the endpoint devices 26 are depicted as set-top boxes.

As shown, the server 20 receives RF performance data from the terminal device 22 in the headend layer, the distribution elements 24 in the distribution layer 14, and the endpoint devices 26 in the endpoint layer 18. The server 20 processes the RF performance data and sends RF adjustment data, in response. A less than optimal tuned RF network typically experiences video glitches and data interruptions on the Internet connections of the subscribers at the endpoint devices 26. Temperature, the age of the contacts, a change in the number of users, or changes in load may impact the performance of the network 12, including the distribution elements 24. The system 10 provides self-monitoring and self-calibrating to the network 12, including the distribution element 24, to optimally tune the network 12 and mitigate unwanted video glitches and data interruptions. The server 20 receives the RF performance data, which includes physical device location information, the connection and distribution information, and substantially real time signal power level and quality reports and analyzes the data and determines the necessary adjustments to the various components—terminal device 22, distribution elements 24, and end point devices 26—within the network 12. The various performance criteria and the signal adjustment algorithms are determined by and stored at the server 20.

In one embodiment of this architecture, as will be discussed in further detail hereinbelow, the distribution elements 24 include network controlled amplifier circuits that provide bidirectional RF signal distribution between the endpoint devices 26 and the terminal device 22, which, as mentioned, may include headend modulation equipment such as video servers and CMTS. Such distribution elements 24 may include built-in cable modem functionality that permits communication with the terminal device 22 and the end point devices 26, to enable the feeding of the signal measurement data to the server 20 to complete the monitoring and provide for the calibration. In this scheme, the distribution elements 24 adjust the power and amplification levels and participate in diagnostic exercise by enabling test signal and test patters to both upstream and downstream RF paths within the network 12.

Figure 2:
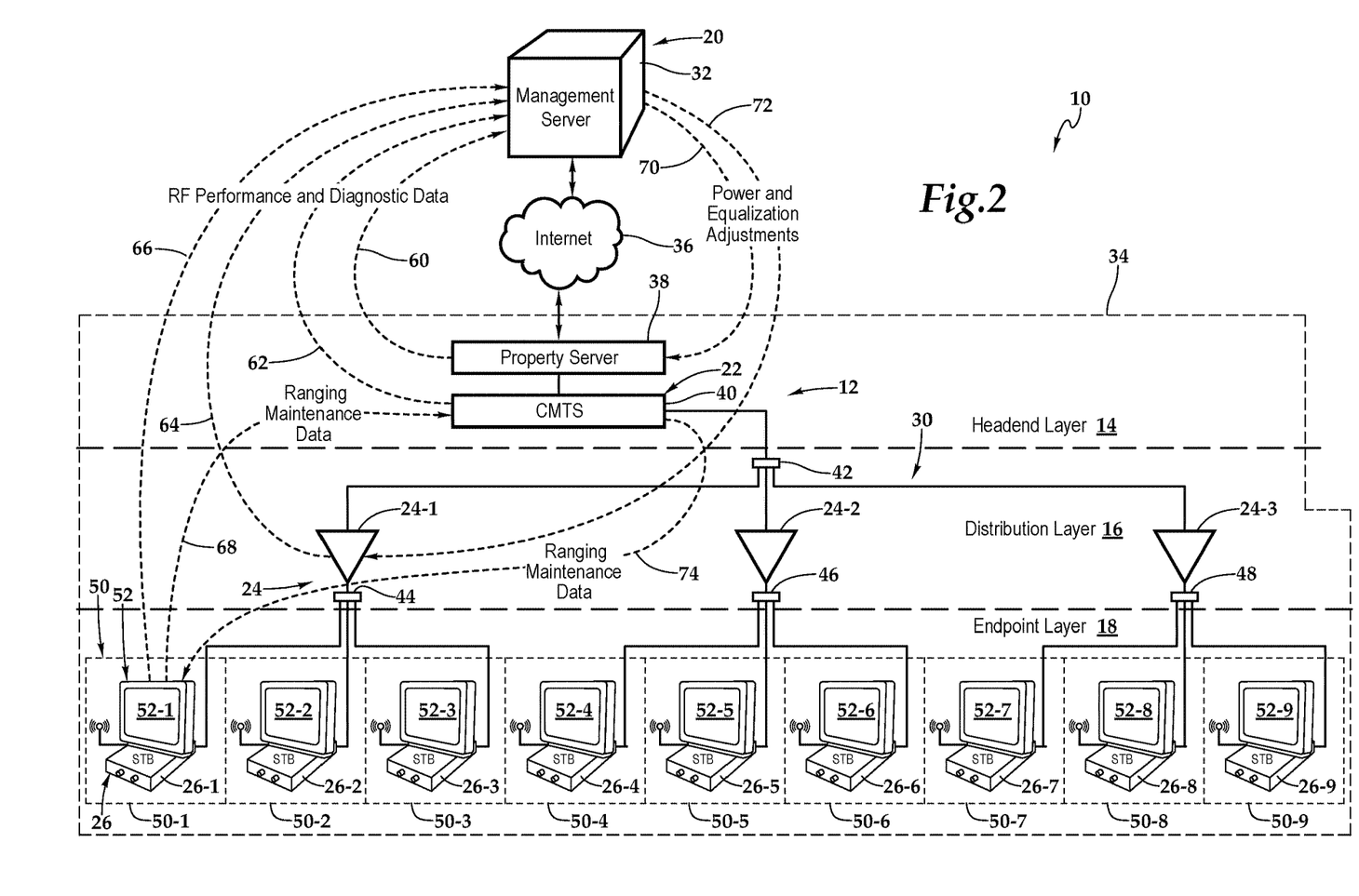
FIG. 2 is a schematic diagram depicting one embodiment of a self-calibrating CATV RF network having high-bandwidth data transfers thereon using a distribution element according to the teachings presented herein.

Referring now to FIG. 2, one embodiment of the system 10 is depicted in further detail. In the illustrated embodiment, a self-calibrating CATV RF network 30 having high-bandwidth data transfers thereon according to the teachings presented herein is illustrated. Similar to the network 12, the CATV RF network 30 includes the management server 32, which is a cloud-based server, acting as the server 20 in communication with properties 34 via the Internet 36. A property server 38 is co-located with CMTS 40, which serves as the terminal device 22. As discussed, the management server 32 may be a centralized management server that can take physical device location information, connection and distribution information and real time signal power level and quality reports from each end point device. The management server 32 may then analyze the data and determine the necessary adjustments to the distribution elements and varied headend layer modulation devices. The performance criteria and the signal adjustment algorithms are determined by the management server 32 or alternatively, stored at the management server 32.

In one embodiment, the CATV RF network 30 includes high-bandwidth data transfers and a shared bi-directional networks with point-to-multipoint transmission in the downstream direction, and multipoint-to-point transmission in the upstream direction. Signals are distributed via an electrical signal on coaxial cable, for example via a tree and branch coaxial cable distribution network. Terminal equipment supports the delivery of cable services (video, data and voice services) to subscribers, via cable modems, for example. Data and voice services are supported by cable modems and communication gateways, respectively, which require the use of an upstream signal path. The network 12 may use a fiber optic upstream signal path from the node to the headend. A return band is used to support transmissions from devices at subscribers' rooms to the headend.

Such a CATV RF network 30 generally uses standardized communication protocol based on the Data over Cable System Interface Specification (DOCSIS) to access data services through the cable network, by using the downstream path to indicate exactly when each modem is permitted to transmit in the upstream direction. The DOCSIS utilizes two primary data transmission elements; namely, the CMTS 40 located in specified nodes on the CATV RF network 30 for distributing data to end-of-line subscribers; and set-top boxes residing at subscriber's rooms. Subscribers send data from their digital devices (PC, VoIP phone, Video IP device, etc.) into the endpoint device, e.g. set-top box, which then relays the data to the CMTS, which in turn relays the information to the appropriate network element. Information destined to the subscriber digital device is provided from the network to the CMTS, which in turn relays the information to the set-top box. The endpoint device, e.g. set-top box, in turn relays the information to the subscriber's digital device, such as a television. Additional network elements may be placed inside the cable network to support service delivery or to monitor service quality. All system maintenance, operation and network communications are outlined in the DOCSIS specification.

The DOCSIS requires that the downstream communication path be properly functioning for any upstream communication to happen. In cases where the signal to noise ratio (SNR) is too low in the downstream path for the cable modem to receive data, the downstream path may be unusable while the upstream path may function correctly. In such cases, a service call may require a service technician to be dispatched to a subscriber's location, considerable cost and loss of time. It is, therefore, advantageous to implement an overall network management system that can quickly and cost-effectively locate various network faults and monitor network performance to allow for optimum delivery of various services to subscribers.

Continuing to refer to FIG. 2, the CMTS 40 is a piece of equipment, typically located at a headend of the hospitality lodging establishment. The CMTS 40 is used to provide high speed data services, such as cable Internet or Voice over Internet Protocol, to cable subscribers. Various headend and video modulation devices may be incorporated into the CMTS 40 to receive RF signals transmitted efficiently through long distances and decode the RF signals at the video modulation devices.

A splitter 42 divides the signal and the distribution elements 24 including distribution elements 24-1, 24-2, and 24-3, take an RF signal as an input, following analysis, amplify and adjust the signal shape, and output the amplified RF signal which, as shown, travels through splitters 44, 46, 48 prior to reaching rooms 50, which are individually numbered 50-1, 50-2, 50-3, 50-4, 50-5, 50-6, 50-7, 50-8, and 50-9. In the various rooms 50 of the property, endpoint devices 26, which are individually numbered 26-1, 26-2, 26-3, 26-4, 26-5, 26-6, 26-7, 26-8, and 26-9 and displays 52, which are individually labeled 52-1, 52-2, 52-3, 52-4, 52-5, 52-6, 52-7, 52-8, and 52-9 are located. As shown, the endpoint devices 26 are illustrated as set-top boxes and as used herein, set-top boxes, back boxes and set-top/back boxes may be discussed as set-top boxes. By way of example, the set-top box may be a set-top unit that is an information appliance device that generally contains set-top box functionality including having a television-tuner input and displays output through a connection to the display or the television set and an external source of signal, turning by way of tuning the source signal into content in a form that can then be displayed on the television screen or other display device. Such set-top boxes are used in cable television, satellite television, and over-the-air television systems, for example.

The displays 52 may be an output device for display of information and the television set may be a device that combines elements of a tuner, display, and loudspeakers for the purpose of viewing information. As shown, groups of set-top boxes are secured to splitters 44, 46, 48, which may act as directional couplers, which are passive devices used in the field of RF that couple a defined amount of the electromagnetic power in a transmission line to a port enabling the RF signal to be used by multiple set-top boxes.

As depicted in FIG. 2, RF performance and diagnostic data 60, 62, 64, 66 is collected from the property server 38, CMTS 40, distribution element 24-1, and the endpoint device 26-1, by way of the ranging maintenance data 68. The management server 32 analyzes this data and sends power and equalization adjustments 70, 72 to the properties 34. Additionally, ranging maintenance 74 is provided to the set-top box 26-1.

Figure 3:
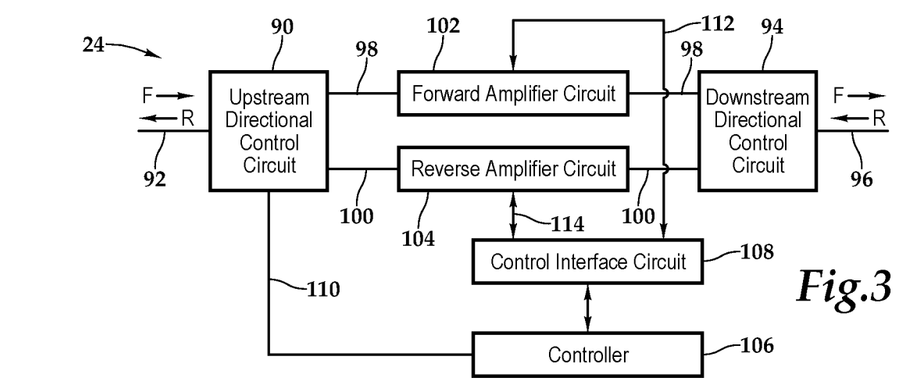
FIG. 3 is a functional block diagram depicting one embodiment of the distribution element presented in FIGS. 1, 2, and 3.

Referring now to FIG. 3, the distribution elements 24 for a self-calibrating RF network having a headend layer 14 and an endpoint layer 18 with the distribution element 16 located therebetween is depicted. An upstream directional control circuit 90 is configured to receive a forward transmission path F on an upstream line 92 from the headend layer 14. The upstream directional control circuit 90 is also configured to transmit a reverse transmission path R on the upstream line 92 to the headend layer 14. Similarly, a downstream directional control circuit 94 is configured to transmit the forward transmission path F on a downstream line to the endpoint layer 18. Further, the downstream directional control circuit 94 is configured to receive the reverse transmission path R on the downstream line 96 from the endpoint layer 18. The upstream directional control circuit 90 and the downstream directional control circuit 94 are positioned in a spaced opposing relationship such that the respective upstream line 92 and the downstream line 96 are separated into a forward line 98 and a reverse line 100 therebetween, while being combined at the respective upstream directional control circuit 90 and the downstream directional control circuit 94.

A forward amplifier circuit 102 is interposed between the upstream directional control circuit 90 and the downstream directional control circuit 94 on the forward line 98. The forward amplifier circuit 102 amplifies and adjusts the shape of a forward signal on the forward line 98. A reverse amplifier circuit 104 interposed between the upstream directional control circuit 90 and the downstream directional control circuit 94 on the reverse line 100. The reverse amplifier circuit 104 amplifies and adjusts the shape of a downstream signal on the reverse line 100.

A controller 106 is disposed in communication with the forward amplifier circuit 102 and the reverse amplifier circuit 104 via a controller interface 108. The controller 106 enables the monitoring and controllability functionality of the distribution elements 24. The controller 106 receives a loopthrough signal 110 on a loopthrough signal line from the upstream directional control circuit 90. The controller 106 monitors and analyzes the loopthrough signal 110 to provide calibration, if necessary, for the middle stages of the network 12 between the headend layer 14 and the endpoint layer 18. The controller 106 provides control signals 112 to the forward amplifier circuit 102 to adjust and shape the signal on the forward line 98. Similarly, the controller 106 provides control signals 114 to the reverse amplifier circuit 104 to adjust and shape the signal on the reverse amplifier circuit 104.

Figure 4:
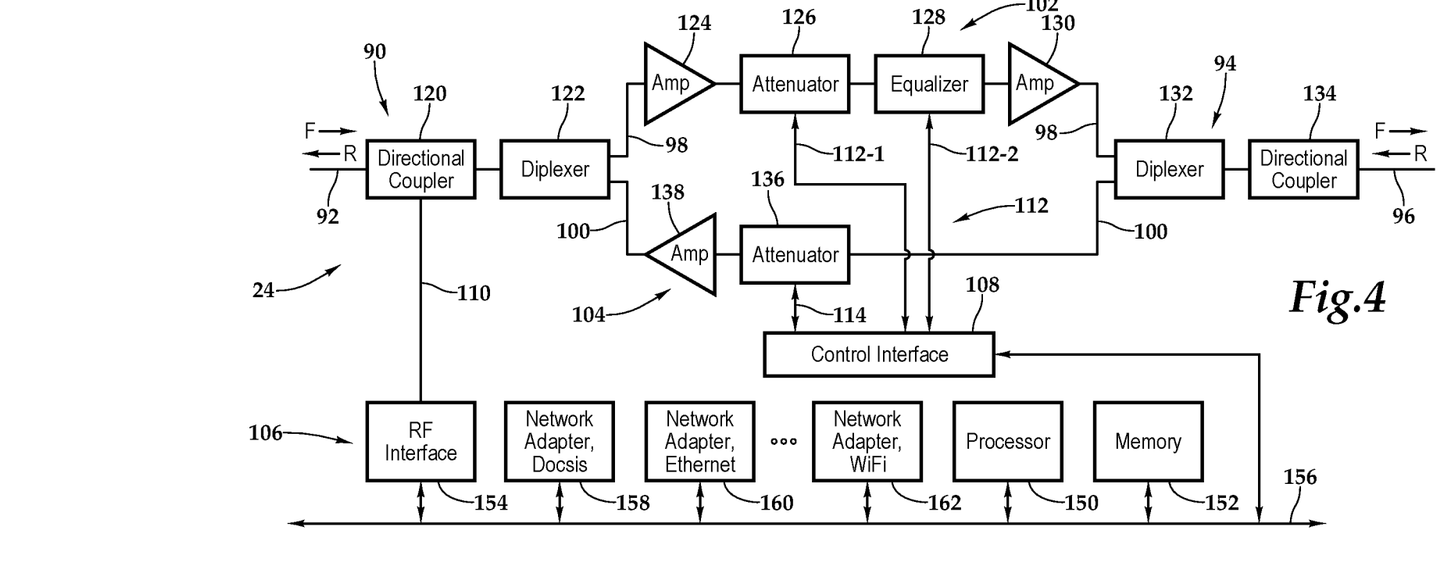
FIG. 4 is a functional schematic diagram depicting one embodiment of the distribution element depicted in FIG. 3.

Referring now to FIG. 4, one embodiment of the distribution element 24 is depicted in further detail. The upstream directional control circuit 90 may include a directional coupler 120 and a diplexer 122. An incoming RF signal is received at the upstream line 92 by the directional coupler 120, which directs a defined amount of the electromagnetic power in the incoming RF signal to each of the diplexer 122 and the controller 106, thereby enabling the incoming RF signal to be utilized by each circuit portion. The diplexer 122 separates the incoming RF signal into forward (generally higher frequency) signals and reverse (usually lower frequency) signals. The forward signals from the diplexer 122 are applied to the forward amplifier circuit 102. More particularly, the forward signals from the diplexer 122 are applied an input amplifier 124 that is used to amplify the signal before further downstream processing. The output of the input amplifier 124 is received by an interstage attenuator 126 and an interstage equalizer 128, which are connected in series. The interstage attenuator 126 and the interstage equalizer 128 are utilized, as required, to shape the static response of the input amplifier 124 prior to the output being received by an output amplifier 130. At the output amplifier 130, the signal is amplified before being received by the downstream directional control circuit 94. Within the directional control circuit 94, a diplexer 132 separates the forward and reverse signals in a manner similar to the diplexer 122. The downstream signals are applied to a directional coupler 134, which directs a defined amount of the electromagnetic power in the RF signal to the RF signal output.

The reverse signals from the diplexer 132 are applied to the reverse amplifier circuit 104, which includes an initial attenuator 136, which is utilized as required, to shape the static response of the reverse RF signal from the diplexer 132 prior to receipt by an amplifier 138, which is connected in series, that is used to amplify the signal. The signal is received by the diplexer 122 and then applied to the directional coupler 120. It should be appreciated that the design of the distribution element may vary depending on application. Other distribution elements may have fewer or more inputs and outputs, and fewer or more amplification stages. The design disclosed in FIG. 4 is presented by way of example and not as a limitation to the applicability of the teachings presented herein.

Within the controller 106, a processor 150, memory 152, and RF interface 154 are interconnected by a busing architecture 156 within a mounting architecture. Various network adapters 158, 160, 162 may also be interconnected in the busing architecture 156. The processor 150 may process instructions for execution within the computing device, including instructions stored in the memory 152. The memory 152 stores information within the computing device. In one implementation, the memory 152 is a volatile memory unit or units. In another implementation, the memory 152 is a non-volatile memory unit or units. Storage (not shown) may be included to provide capacity that is capable of providing mass storage for the controller 106. The RF interface 154 provides communication with the directional coupler 120 via the loopthrough signal line 110. The network adapters 158, 160, 162 provide connections to and from the controller 106, wherein the network adapters 158, 160, 162 are the signals or data received by the controller 106 with elements external to the distribution elements 24, and the signals or data sent from the controller 106 to elements external to the distribution elements 24. By way of example, the network adapters 158, 160, 162 may be DOCSIS network adapters, modems, ethernet network adapters, and Wi-Fi network adapters, for example. The network adapters 158, 160, 162 may also receive the loopthrough signal 110 for the RF interface 154 for processing. As illustrated, by way of further example, the network adapter 158 is a DOCSIS network adapter, the network adapter 160 is an ethernet adapter, and the network adapter 162 is a Wi-Fi adapter.

The memory 152 is accessible to the processor 150 and includes processor-executable instructions that, when executed, cause the processor 150 to execute a series of operations. In some embodiments, the processor-executable instructions receive a profile via one of the network adapters. The profile defines signal-to-noise ratios and signal shape of RF signals in the distribution layer 16 in terms of power and equalization. In one implementation, the profile is created in the headend layer 14 with data from the headend layer 14 and the endpoint layer 18. The profile is then appropriately propagated through the network to the distribution elements 24. The profile may be received via the DOCSIS network adapter, the modem adapter by way of loopthrough signal 110, or the Wi-Fi adapter. The architecture of the network 12 will influence the transceiver path selected. The processor-executable instructions may then cause the profile to be stored. The processor 150 may then receive a loopthrough signal 110 from the upstream directional control circuit 90 via the RF interface 154. The processor-executable instructions cause the processor to utilize the profile to analyze the loopthrough signal 110 and, based on the analysis, send a control signal to at least one of the forward amplifier circuit 102 and the reverse amplifier circuit 104 to adjust the signal-to-noise ratio and signal shape. As shown, control signals 112, and in particular control signal 112-1, is sent to attenuator 126. Control signal 112-2 is sent to the interstate equalizer 128. Further, control signal 114 is sent to the attenuator 136. It should be appreciated that the adjustments and control signaling at the distribution elements 24 may vary depending on implementation. As presented herein, in some embodiments, the distribution elements 24 provide a network controllable amplifier with network analysis capability built in with self-calibrating connection support based on the pre-loaded or real-time parameters on the profile. This enables the distribution elements 24 to provide calibration for the distribution layer 16.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A distribution element located between the headend layer and the endpoint layer of a self-calibrating RF network, the distribution element comprising:
   an upstream directional control circuit configured to receive a forward transmission path on an upstream line from a headend layer, the upstream directional control circuit configured to transmit a reverse transmission path on the upstream line to the headend layer;
   a downstream directional control circuit configured to transmit the forward transmission path on a downstream line to an endpoint layer, the downstream directional control circuit configured to receive a reverse transmission path on the downstream line from the endpoint layer;
   the upstream directional control circuit and the downstream directional control circuit being positioned in a spaced opposing relationship such that the respective upstream line and the downstream line are separated into a forward line and reverse line therebetween, while being combined at the respective upstream directional control circuit and the downstream directional control circuit; and
   a controller comprising:
      a processor, a memory, and an RF interface,
      a busing architecture communicatively interconnecting the processor, the memory, and the RF interface,
      the memory including a profile defining signal-to-noise ratios,
      the memory accessible to the processor, the memory including processor-executable instructions that, when executed, cause the processor to:

receive a loopthrough signal from the upstream directional control circuit via the RF interface, utilize the profile to analyze the loopthrough signal, and based on the analysis, determine adjustments to the signal-to-noise ratios.

2. The distribution element as recited in claim 1, wherein the upstream directional control circuit further comprises a directional coupler connected to the upstream line, the directional coupler driving a signal to the controller.

3. The distribution element as recited in claim 1, wherein the downstream directional control circuit further comprises a directional coupler connected to the downstream line, the directional coupler driving a signal to the controller.

4. The distribution element as recited in claim 1, further comprising at least one network adapter, the network adapter configured to receive the profile.

5. The distribution element as recited in claim 1, further comprising at least one network adapter selected from the group consisting of DOCSIS network adapters, modems, ethernet network adapters, and Wi-Fi network adapters.

6. The distribution element as recited in claim 1, wherein the memory further comprises processor-executable instructions that, when executed, cause the processor to generate test signals and test patterns for the upstream directional control circuit via the RF interface.

7. The distribution element as recited in claim 1, wherein the memory further comprises processor-executable instructions that, when executed, cause the processor to generate test signals and test patterns for the downstream directional control circuit via the RF interface.

8. A distribution element for located between the headend layer and the endpoint layer of a self-calibrating RF network, the distribution element comprising:

an upstream directional control circuit configured to receive a forward transmission path on an upstream line from a headend layer, the upstream directional control circuit configured to transmit a reverse transmission path on the upstream line to the headend layer;

a downstream directional control circuit configured to transmit the forward transmission path on a downstream line to an endpoint layer, the downstream directional control circuit configured to receive a reverse transmission path on the downstream line from the endpoint layer;

the upstream directional control circuit and the downstream directional control circuit being positioned in a spaced opposing relationship such that the respective upstream line and the downstream line are separated into a forward line and reverse line therebetween while being combined at the respective upstream directional control circuit and the downstream directional control circuit; and a controller comprising:
a processor, a memory, and an RF interface,
a busing architecture communicatively interconnecting the processor, the memory, and the RF interface,
the memory including a profile defining signal shape in terms of power and equalization,
the memory accessible to the processor, the memory including processor-executable instructions that, when executed, cause the processor to:
receive a loopthrough signal from the upstream directional control circuit via the RF interface,
utilize the forward window profile and the reverse window profile to analyze the loopthrough signal, and based on the analysis, determine adjustments to the signal shape.

9. The distribution element as recited in claim 8, wherein the upstream directional control circuit further comprises a directional coupler connected to the upstream line, the directional coupler driving a signal to the controller.

10. The distribution element as recited in claim 8, wherein the downstream directional control circuit further comprises a directional coupler connected to the downstream line, the directional coupler driving a signal to the controller.

11. The distribution element as recited in claim 8, further comprising at least one network adapter, the network adapter configured to receive the profile.

12. The distribution element as recited in claim 8, further comprising at least one network adapter selected from the group consisting of DOCSIS network adapters, modems, ethernet network adapters, and Wi-Fi network adapters.

13. The distribution element as recited in claim 8, wherein the memory further comprises processor-executable instructions that, when executed, cause the processor to generate test signals and test patterns for the upstream directional control circuit via the RF interface.

14. The distribution element as recited in claim 8, wherein the memory further comprises processor-executable instructions that, when executed, cause the processor to generate test signals and test patterns for the downstream directional control circuit via the RF interface.

15. A distribution element for a self-calibrating RF network having a headend layer and an endpoint layer with the distribution element located therebetween in a middle stage, the distribution element comprising:

an upstream directional control circuit configured to receive a forward transmission path on an upstream line from the headend layer, the upstream directional control circuit configured to transmit a reverse transmission path on the upstream line to the headend layer;

a downstream directional control circuit configured to transmit the forward transmission path on a downstream line to the endpoint layer, the downstream directional control circuit configured to receive a reverse transmission path on the downstream line from the endpoint layer;

the upstream directional control circuit and the downstream directional control circuit being positioned in a spaced opposing relationship such that the respective upstream line and the downstream line are separated into a forward line and reverse line therebetween while being combined at the respective upstream directional control circuit and the downstream directional control circuit; and a controller comprising:
a processor, a memory, an RF interface, and a network adapter,
a busing architecture communicatively interconnecting the processor, the memory, the RF interface, and the network adapter,
the memory accessible to the processor, the memory including processor-executable instructions that, when executed, cause the processor to:
receive a profile via the network adapter, the profile defining signal-to-noise ratios and signal shape in terms of power and equalization, the profile being created at the headend layer with data from the headend layer and the endpoint layer,
store the profile,
receive a loopthrough signal from the upstream directional control circuit via the RF interface, the loopthrough signal providing calibration for the middle stage of the self-calibrating RF network between the headend layer and the endpoint layer, utilize the profile to analyze the loopthrough signal, and based on the analysis, determine adjustments to the signal-to-noise ratio and signal shape.

16. The distribution element as recited in claim 15, wherein the upstream directional control circuit further comprises a directional coupler connected to the upstream line, the directional coupler driving a signal to the controller.

17. The distribution element as recited in claim 15, wherein the downstream directional control circuit further comprises a directional coupler connected to the downstream line, the directional coupler driving a signal to the controller.

18. The distribution element as recited in claim 15, further comprising at least one network adapter selected from the group consisting of DOCSIS network adapters, modems, ethernet network adapters, and Wi-Fi network adapters.

19. The distribution element as recited in claim 15, wherein the memory further comprises processor-executable instructions that, when executed, cause the processor to generate test signals and test patterns for the upstream directional control circuit via the RF interface.

20. The distribution element as recited in claim 15, wherein the memory further comprises processor-executable instructions that, when executed, cause the processor to generate test signals and test patterns for the downstream directional control circuit via the RF interface.

* * * * *